United States Patent

Brand et al.

[11] Patent Number: 5,889,666
[45] Date of Patent: *Mar. 30, 1999

[54] METHOD AND APPARATUS FOR CONTROLLING PROVIDING OF CONDITIONED AC POWER

[75] Inventors: Gerald J. Brand, Derry, N.H.; Don L. Drinkwater, Carlisle, Mass.; James M. Simonelli, Grafton, Mass.; Zeljko Arbanas, Hudson, Mass.

[73] Assignee: Digital Equipment Corporation, Houston, Tex.

[*] Notice: The term of this patent shall not extend beyond the expiration date of Pat. No. 5,764,503.

[21] Appl. No.: 984,324

[22] Filed: Dec. 3, 1997

Related U.S. Application Data

[63] Continuation of Ser. No. 347,008, Nov. 30, 1994.
[51] Int. Cl.$^6$ ........................................ H02M 5/12
[52] U.S. Cl. .................................. 363/78; 363/79
[58] Field of Search ........................ 363/34, 37, 74, 363/39, 78, 40, 79, 65, 95, 97, 132; 307/48, 64, 65, 66, 80, 81; 364/431.11

[56] References Cited

U.S. PATENT DOCUMENTS

| | | |
|---|---|---|
| 4,024,451 | 5/1977 | Nishino et al. ........................ 321/2 |
| 4,605,997 | 8/1986 | Kirk ........................................ 363/16 |
| 4,860,185 | 8/1989 | Brewer et al. ........................ 363/41 |
| 5,019,717 | 5/1991 | McCurry et al. ..................... 307/66 |
| 5,490,054 | 2/1996 | Hanebrink et al. .................. 363/21 |
| 5,519,306 | 5/1996 | Itoh et al. ............................ 323/222 |

*Primary Examiner*—Adolf Deneke Berhane
*Attorney, Agent, or Firm*—Hamilton, Brook, Smith & Reynolds

[57] ABSTRACT

A method and apparatus for controlling the providing of conditioned AC power, with the conditioned AC power being capable of being provided on a continuous basis. Unconditioned AC voltage is received by transverters. The transverters convert the unconditioned AC voltage into a transverter AC output voltage. The transverter AC output voltage is monitored by current and voltage sensors. A transverter control signal is developed in response to changes in the current and voltage sensing in comparison with a reference signal. The transverter control signal then regulates conversion of the transverter AC output voltage into the desired conditioned AC output voltage. In multi-phase AC voltage systems conditioned AC voltages for each phase are provided.

19 Claims, 10 Drawing Sheets

METHOD AND APPARATUS FOR CONTROLLING PROVIDING OF CONDITIONED AC POWER

This application is a continuation of application Ser. No. 08/347,008, filed Nov. 30, 1994.

BACKGROUND OF THE INVENTION

This invention relates to the field of electrical power supplies and, more particularly, power supplies which provide conditioned AC output voltage power, such as those which may be employed in providing power for the operation of computing or telecommunications systems.

Electrical power is used to drive the operation of various mechanical, electromechanical, electronic and other devices. One form of electrical power is alternating current (AC), as provided by public utility companies. Typical AC voltages provided (e.g., a standard wall outlet in the home) are in sine wave form, can have voltage ranges from 90 to 132 AC volts and can have various forms of electrical "noise" superimposed on the AC voltage wave provided. Typical AC voltages can be provided in single or multiple voltage "phases" (e.g., a three-phase system).

Certain electrical and electronic devices utilizing AC power need such power having specifically defined ("conditioned") parameters of voltages, currents and waveforms to drive precision components, such as those used in computer systems. In addition, various electronic devices and computer systems in particular, also rely on the continuous supply of power to effectively operate.

Various techniques have been developed to provide power to computer systems. Transverter devices in various forms convert AC to DC and vice versa. Several such transverter approaches are described in copending application Ser. No. 08/164,649 filed on Dec. 8, 1993 by Gerald J. Brand et al, entitled INPUT POWER PROCESSING POWER ARCHITECTURE, which is a File Wrapper Continuation of application Ser. No. 07/896,260 filed on Jun. 10, 1992. These applications and the technology described therein are incorporated herein by reference.

Various techniques have also been developed to provide a continuous or uninterruptable supply of power to computer systems. DC battery backup units are well known for providing auxiliary power to a computer system in the event of an outage of AC power supplied by the utility company.

However, not only does a need exist for the continuous supply of power, but there is also a need for the continuous supply of conditioned AC power.

Various prior approaches have been employed to provide continuous supply of conditioned AC power, but they have disadvantages. For example, one approach uses backup AC power supplies which are switched into place when the primary supplies becomes defective. While such a procedure attempts to address the continuity of AC power, this approach is inefficient. Typically, these backup AC power supplies are not utilized until they are needed to be switched into place. The switching is typically manual and can also cause brief discontinuities while the switching is being undertaken. What is needed is a effective, easy to use and implement approach for providing conditioned AC power, and for providing of conditioned AC power on a continuous basis. The invention as described herein provides such an approach.

SUMMARY OF THE INVENTION

In accordance with the present invention, a method and apparatus for providing of conditioned AC power, with the conditioned AC power being provided on a continuous basis, is described. Unconditioned AC voltage is received by transverter means. The transverter means converts the unconditioned AC voltage into a transverter AC output voltage. The transverter AC output voltage is monitored by current and voltage sensor means. A transverter control signal is developed in response to changes in the current and voltage in comparison with a reference signal. The transverter control signal then regulates conversion of the transverter AC output voltage into the desired conditioned AC output voltage.

In accordance with a further aspect of the present invention, the unconditioned AC voltage is received by a plurality of transverters. The outputs of each of the transverters are connected in parallel to produce the total transverter AC output voltage. The inputs of the transverters are connected in series to receive the transverter control signal. The transverter control signal flowing through the inputs of the transverters in series regulates the conversion at the parallel transverter output into the conditioned AC output voltage. With such an arrangement, the plurality of transverters enable continuous conditioned AC output power to be provided. This is accomplished by sensing the output voltage and current conditions and using the transverter control signal produced to adjust the total transverter AC output voltage to the desired conditioned values. This adjusting process is particularly useful should one of the transverters fail to produce its specified output voltage. The invention will then permit the other transverters to compensate for loss of one of the transverters through the use of the transverter control signal.

In another version of the invention, multi-phase conditioned AC voltage can be provided by having an embodiment of the invention for each of the desired phases of voltage in the multi-phase system.

DESCRIPTION OF THE PREFERRED EMBODIMENTS

Figure 1:
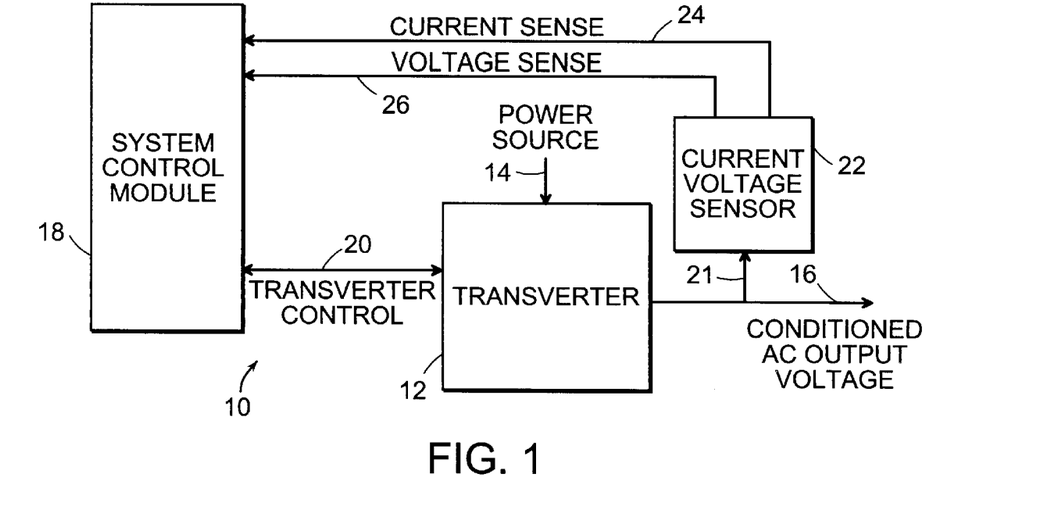
FIG. 1 shows in block diagram form an overview of one aspect of the invention.

Referring now to FIG. 1 a transverter controlled feedback subsystem 10 is shown to control application of conditioned AC power. Transverter controlled feedback subsystem 10 includes a transverter 12 which receives power 14 from a power source (not shown) and produces a conditioned AC output voltage. To maintain the conditioned AC output voltage transverter 12 is controlled by control signals 20 from system control module 18 which receives feedback current sense signals 24 and voltage sense signals 26 from current voltage sensor 22 which monitors conditioned AC output voltage 16.

Figure 2:
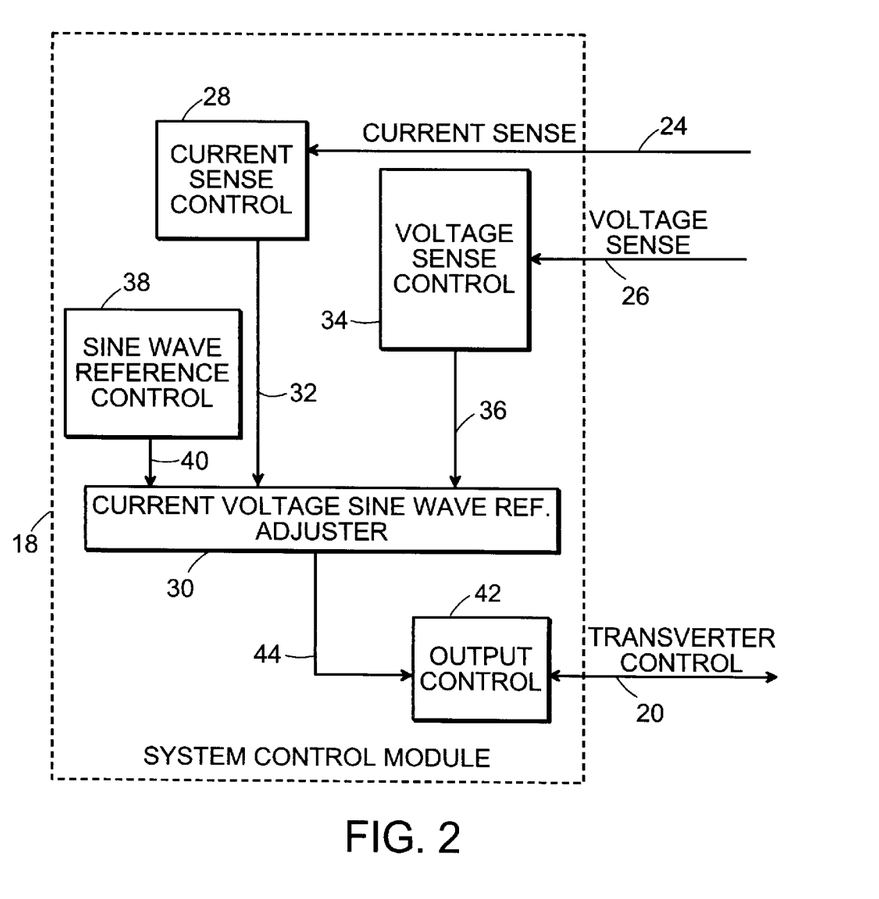
FIG. 2 shows in block diagram form the system control module as used in the preferred embodiment of the invention.

Referring now to FIG. 2, a system control module 18 as used in the preferred embodiment of the invention is shown. System control module 18 has a current sense control 28, voltage sense control 34, sine wave reference control 38, current voltage sine wave reference adjuster 30 and output control 42. Current sense control 28 receives as input current sense signal 24 and provides an output signal 32 which is received by current voltage sine wave reference adjuster 30. Voltage sense control 34 receives as input voltage sense signal 26 and provides an output signal 36 which is received by current voltage sine wave reference adjuster 30. Sine wave reference control 38 provides reference signal 40 which is also received by current voltage sine wave reference adjuster 30. Current voltage sine wave reference adjuster 30 processes the received signals as described hereinbelow and provides a signal 44 which is fed to output control 42. Output control 42 then acts as an interface for the transmission (and return) of transverter control 20.

Figure 3:
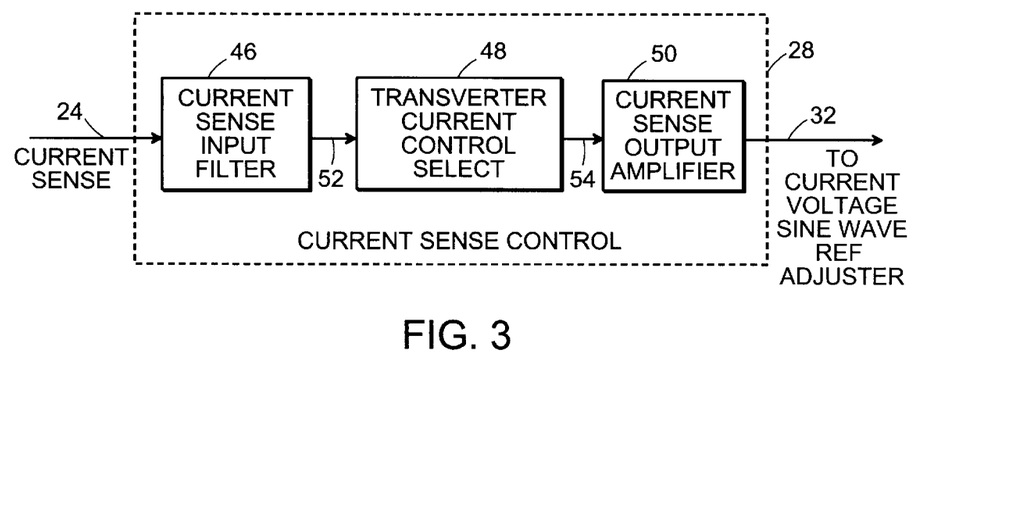
FIG. 3 depicts in block diagram the elements of the current sense control of the system control module.

Referring now to FIG. 3, current sense control 28 of system control module 18 is shown to include three major sub-circuits: current sense input filter 46, transverter current control select 48 and current sense output amplifier 50. Current sense signal 24 is fed into current sense input filter 46 and output 52 of current sense input filter 46 is fed into transverter current control select 48, as shown. Output 54 of transverter current control select 48 is fed into current sense output amplifier 50. Output 32 of current sense output amplifier 50 is fed into current voltage sine wave reference adjuster 30.

Figure 4:
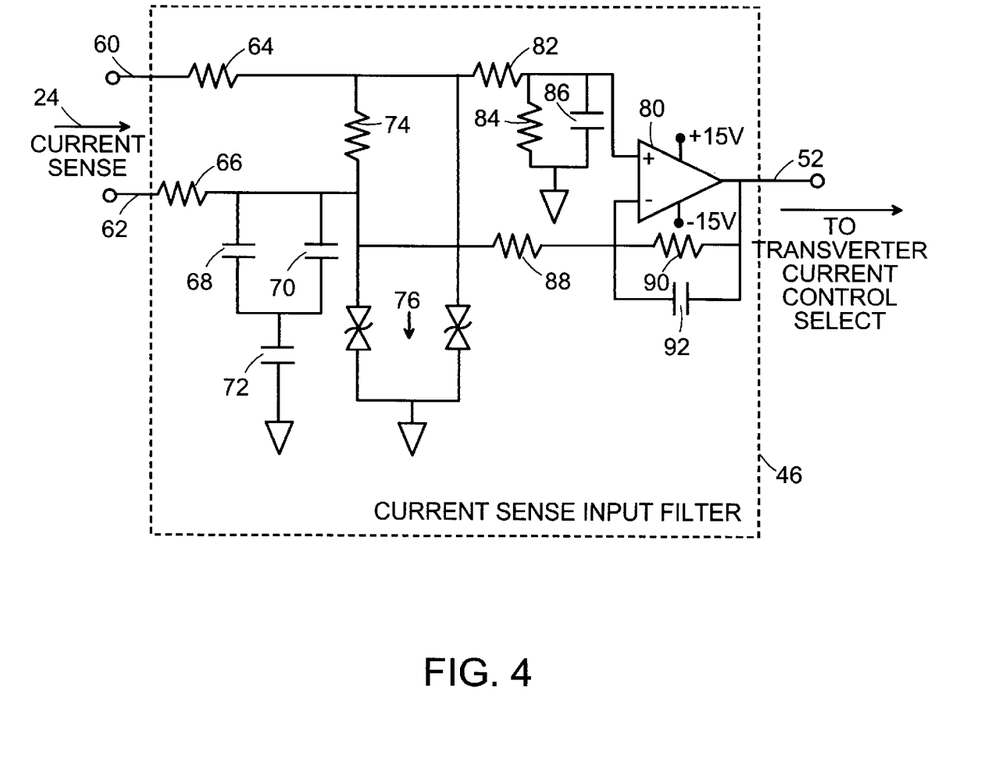
FIG. 4 is a circuit diagram of the current sense input filter of the current sense control.

Referring now to FIG. 4, current sense signal 24 is shown with input line 60 and has a return line 62. Here, 1 Kohm resistors 64 and 66 along with 330 pf capacitors 68 and 70 and 270 pf capacitor 72 are arranged as an input signal filter. A signal from the filter is fed across 2 Kohm resistor 74, and is coupled to transient suppressor pair 76, for filtering of spikes which my damage amplifier 80. Here, an 10K resistor 82, 100K resistor 84 and 18 pf capacitor 86 provide a voltage divider and further filtering to the non-inverting "+" input of amplifier 80. Also 10K resistor 88, 100K resistor 90 and 18 pf capacitor 92 provide a feedback filtered input to the inverting "−" input of amplifier 80. Amplifier 80 is an operational amplifier with +/−15v bias and provides a clean, filtered output signal 52.

Figure 5:
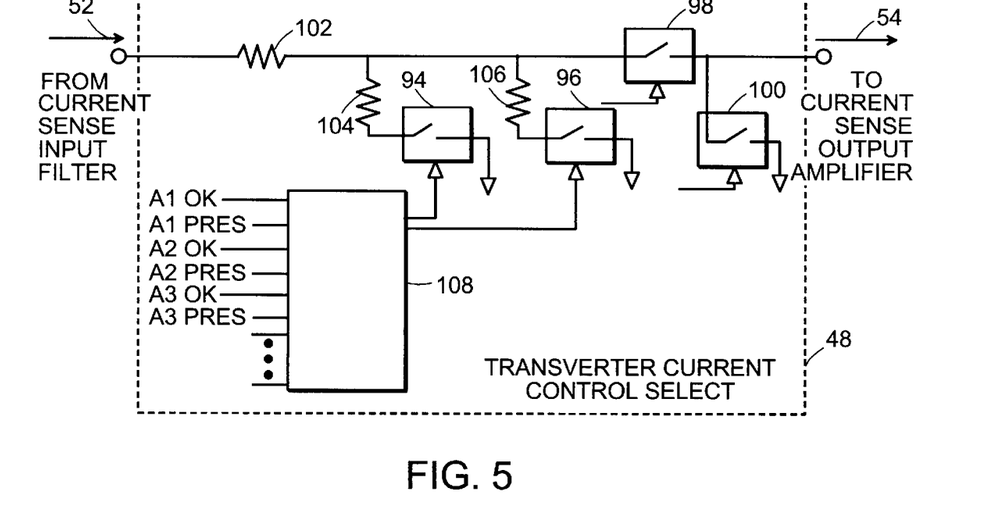
FIG. 5 is a circuit diagram of the transverter current control select of the current sense control.

Referring now to FIG. 5, the transverter current control select circuit 48 is shown. In the preferred embodiment of the invention, the transverter current control select circuit 48 provides appropriate current division depending on whether the system implementation uses one, two or three transverters, as will be described in more detail later. For example, if there was only one transverter in the system, switches 94 and 96 would remain open, switch 98 would be closed to pass signal 52, and switch 100 would be open. However, if a second transverter were put into the system, half the desired current would be divided between the two transverters. In this situation, either switch 94 or switch 96 would be closed. If there were three transverters in the system, both switches 94 and 96 would be closed and signal 52 would then be divided into thirds. The 10K resistors 102, 104 and 106 provide the voltage divider. Switches 94 and 96 are controlled by a Programmable Array Logic (PAL) unit 108. For example, signals associated with the presence and proper functioning of a first transverter A1 (i.e., A1_PRES, A1_OK,), signals associated with the presence and proper functioning of a second transverter A2 (i.e., A2_PRES, A2_OK,) and signals associated with the presence and proper functioning of a third transverter A3 (i.e., A3_PRES, A3_OK,) are provided from an overall system control device (not shown), and each feed input ports of PAL 108. PAL 108 appropriately controls switches 94 and 96 according to the input signal information provided. Switches 98 and 100 merely serve to shut the entire system down if desired. They are activated by other system control signals (also not shown). Output signal 54 is then feed to current sense output amplifier 50.

Figure 6:
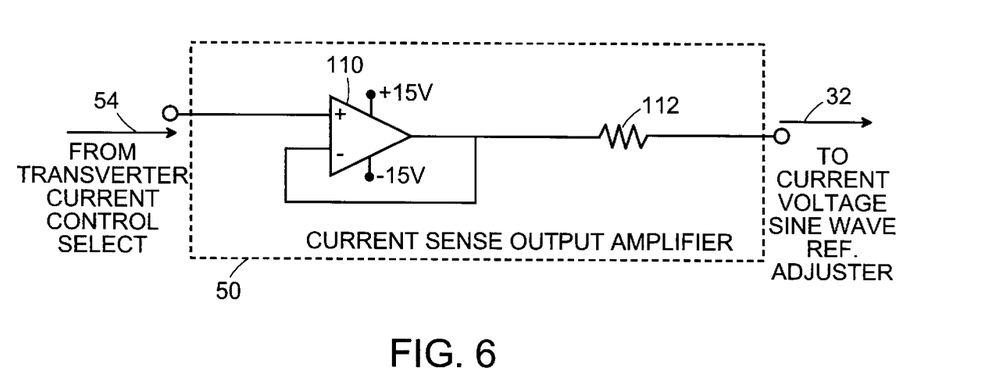
FIG. 6 is a circuit diagram of the current sense output amplifier of the current sense control.

Referring now to FIG. 6, the current sense output amplifier 50 is shown. Signal 54 from transverter current control select 54 feeds buffer amplifier 110 which provides a low impedance source for 10k resistor 112. Output signal 32 then feeds current voltage sine wave reference adjuster 30.

Figure 7:
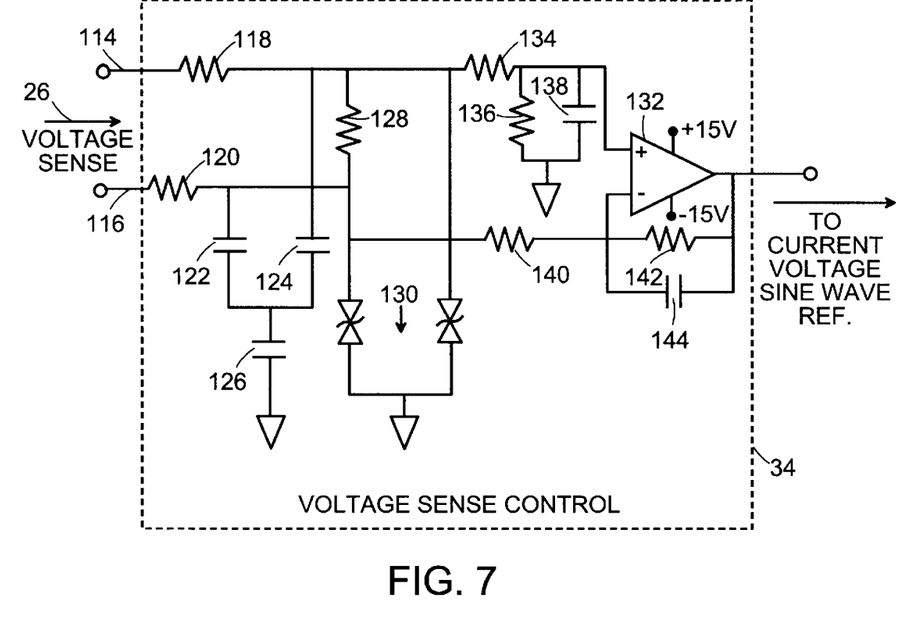
FIG. 7 is a circuit diagram of the voltage sense control of the system control module.

Referring now to FIG. 7, voltage sense control 34 is shown having components and functionality somewhat similar to current sense input filter 46. Voltage sense signal 26 feeds input line 114 and has a return line 116. The 1K resistors 118 and 120 along with 3300 pf capacitors 122 and 124 and 270 pf capacitor 126 act as an input filter. The filter signal is fed across 2K resistor 128, coupled to transient suppressor pair 130, for filtering of spikes which my damage amplifier 132. Here, 10K resistor 134, 11.8K resistor 136 and 18 pf capacitor 138 provide a voltage division and further filtering to the non-inverting "+" input of amplifier 132. Here, 10K resistor 140, 11.8K resistor 142 and 18 pf capacitor 144 provide a feedback filtering input to the inverting "−" input of amplifier 132. Amplifier 132 is an operational amplifier with +/−15v bias and provides a clean, filtered output signal 36.

Figure 8:
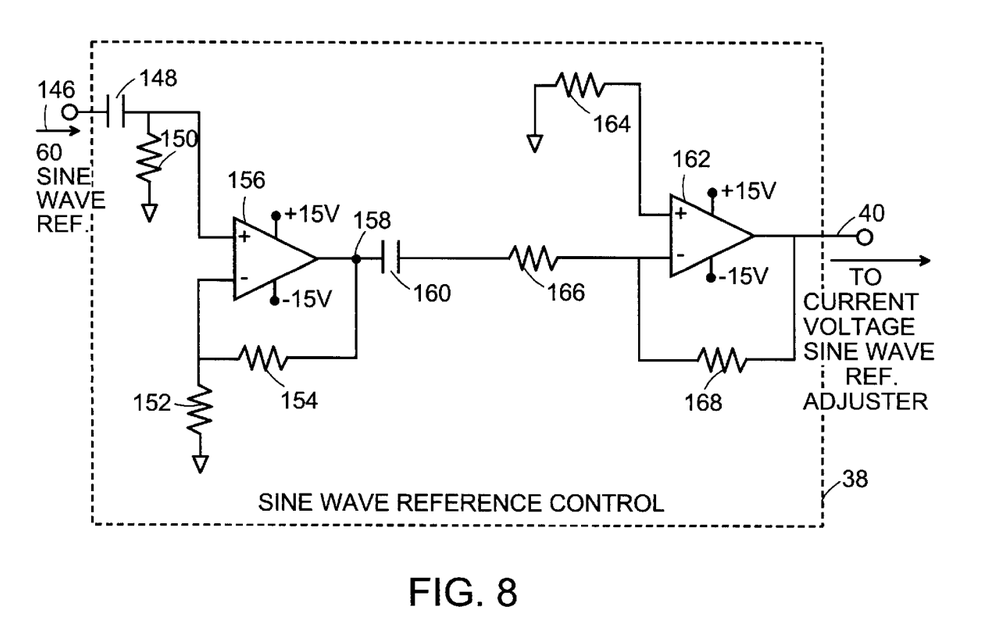
FIG. 8 is a circuit diagram of the sine wave reference control module of the system control module.

Referring now to FIG. 8, sine wave reference control module 38 is shown. A digitized 60 cycle AC sine wave signal 146 is generated (not shown) and feeds sine wave reference control 38. Digitized signal 146 is filtered by 2.2 uf capacitor 148 and 1.58K resistor 150. Here, 2K resistor 152 and 6.49K resistor 154 form a feedback circuit for amplifier 156 which produces an analog sine wave signal at circuit point 158. A 10 uf capacitor 160 blocks DC voltages from amplifier 156, centering the analog sine wave signal about zero DC volts. Inverting amplifier 162, coupled with 10K resistors 164, 166 and 168, produce a negative reference signal 40, which is then fed to current voltage sine wave reference adjuster 30.

Figure 9:
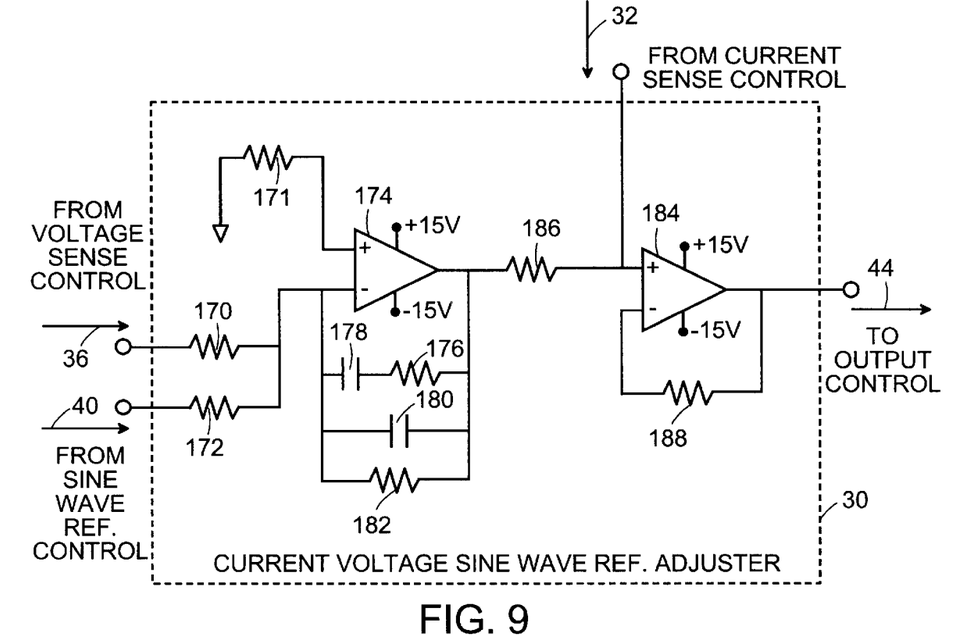
FIG. 9 is a circuit diagram of the current/voltage/sine wave reference adjuster of the system control module.

Referring now to FIG. 9, current voltage sine wave reference adjuster 30 receives current sense control signal 32 from current sense control 28, voltage sense control signal 36 from voltage sense control 34 and sine wave reference control signal 40 from sine wave reference control 38, as shown. Error amplifier 174 receives at its negative input a combination of voltage sense control signal 36 and sine wave reference control signal 40 over 10K resistors 170 and 172 respectively. The positive input to amplifier 174 is connected to ground through 10K resistor 171. A 12 uf capacitor 178 and 1000 pf capacitor 180 along with 2K resistor 176 and 10K resistor 182 form a feedback compensation circuit.

The goal of amplifier 174 is to swing its voltage high or low such that its inputs remain at the same voltage. For example, if the positive input voltage is at all higher than the negative input voltage the output voltage will swing toward the +15 volt bias voltage. On the other hand, if the positive input voltage goes below the negative input voltage, the output voltage will swing toward the −15 volt bias voltage. Since sine wave reference control signal 40 is an inverted sine wave and the value of resistor 172 is equal to the value of resistor 170, amplifier 174 will force the system to be balanced about ground potential, as the positive input of amplifier 174 is grounded through resistor 171. Therefore, the output voltage of amplifier 174 will swing from +15 to −15 volts as necessary, such that voltage sense control signal 36 is made equal and opposite to sine wave reference control signal 40.

The +/−15 volt swinging output voltage of amplifier 174 passes through 10K resistor 186 and combines with current sense control signal 32. The combined voltage then feeds into the voltage follower amplifier 184. This amplifier produces the transverter current reference 44.

As was seen in FIG. 6, 10K resistor 112 is an output resistor of current sense output amplifier 50 which produces current sense control voltage 32. As shown in FIG. 9, resistor 186 is of the same 10K value. As such, amplifier 184 will perform a similar balancing as was described above for amplifier 174. However, the higher the output of amplifier 174 goes, or the higher the current sense control voltage 32 goes, will drive output control voltage 44 more positive. Current voltage sine wave reference adjuster 30, utilizing voltage sensing, current sensing and a sine wave reference, therefore performs the basic feedback adjustment needed to produce the desired transverter current control signal 20, which, in turn, controls transverter 12.

Figure 10:
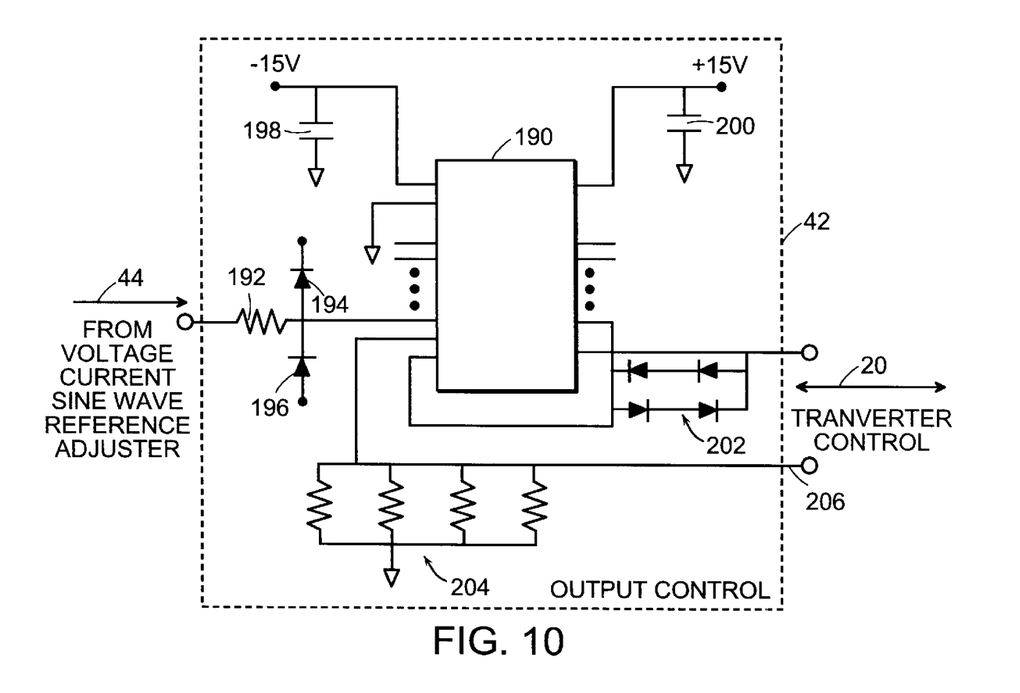
FIG. 10 is a circuit diagram of the output control of the system control module.

Referring now to FIG. 10, output control 42 is shown as a voltage to current converter. Output current control 44 is received as input from voltage current sine wave reference adjuster 30. Output control 42 outputs transverter current control signal 20. Integrated circuit chip 190 helps perform this voltage to current conversion. A 1.5 k resistor 192 and diodes 194 and 196 are used as clamps to protect integrated circuit chip 190. Here 0.1 uf capacitors 198 and 200 filter the respective bias supplies. Diode grouping 202 also protects integrated circuit chip 190. Four 100 ohm resistor grouping 204 couple the transverter control return line 206 to integrated circuit chip 190.

Figure 11:
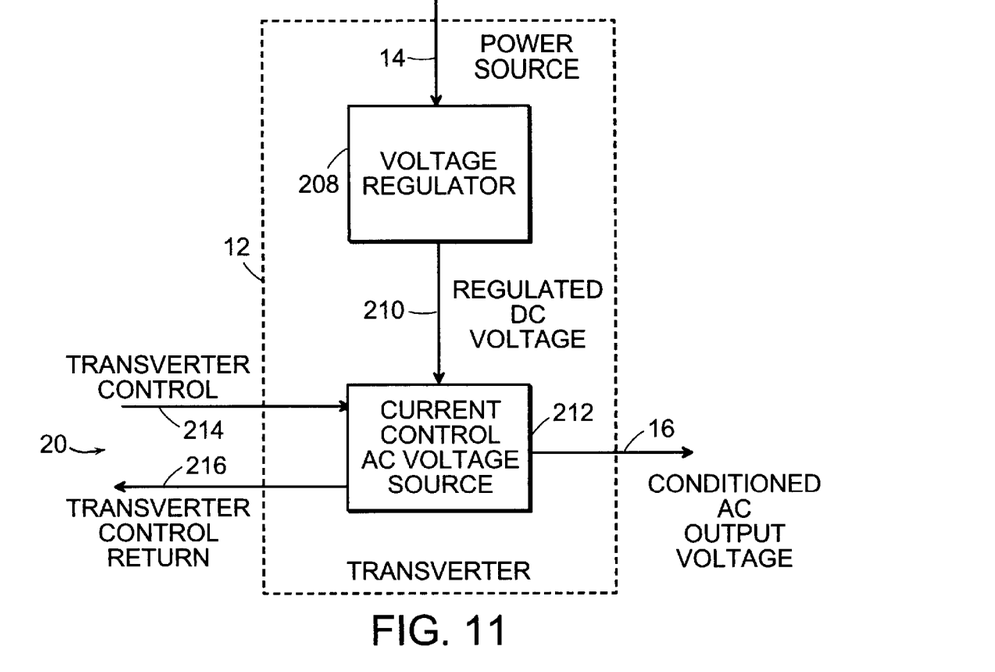
FIG. 11 shows in block diagram form a transverter as used in the preferred embodiment of the invention.

Referring now to FIG. 11 shows in block diagram form transverter 12 as used in the preferred embodiment of the invention. Voltage regulator 208 of transverter 12 receives power 14 from an energy source (e.g. typically a utility). Voltage regulator 208 does filtering, power factor correction and ultimately outputs a regulated DC voltage 210 (in the preferred embodiment +/−200 volts) to current controlled AC voltage source 212. Current controlled voltage source 212 receives transverter control current 20, as an input 214 having a return 216. Current controlled AC voltage source 212, in turn, supplies conditioned AC output voltage 16.

Figure 12:
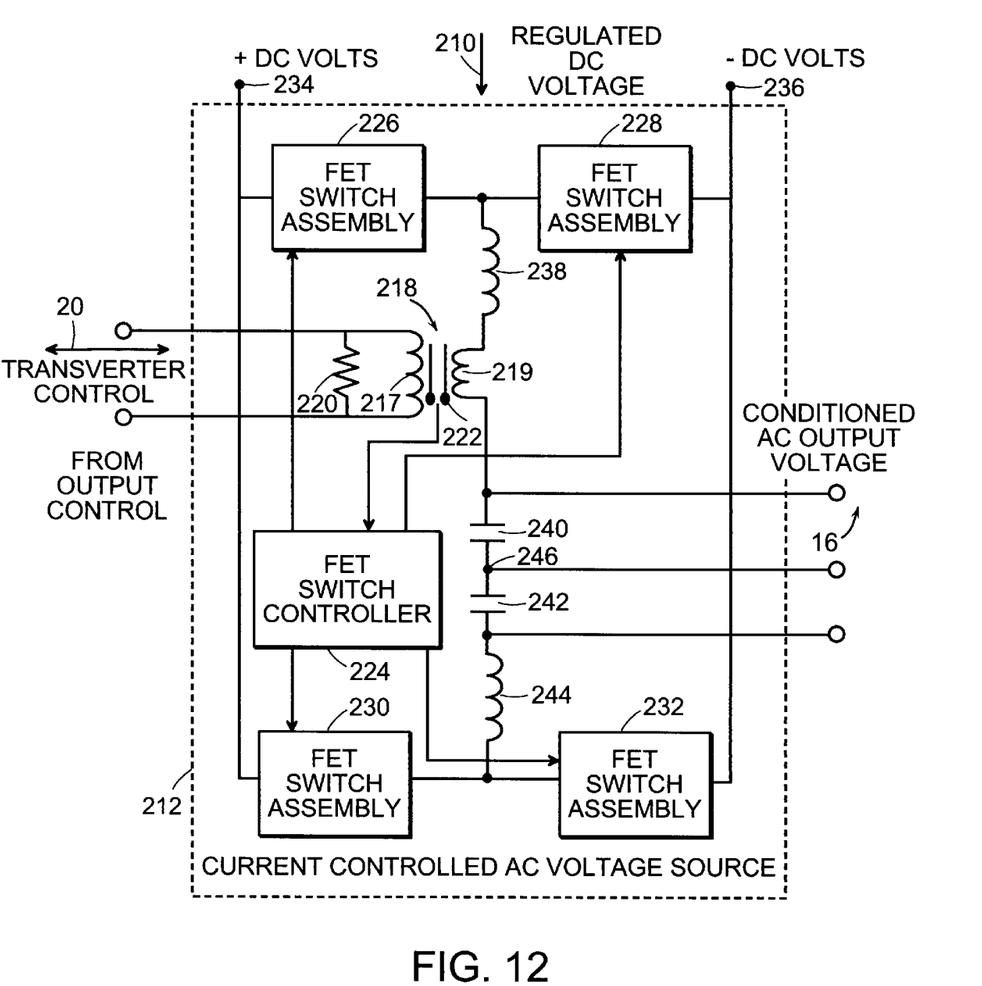
FIG. 12 depicts in both block diagram and circuit diagram form the current controlled AC voltage source of the transverter.

Turning to FIG. 12, there is depicted current controlled AC voltage source 212. The function of the current controlled AC voltage source 212 is to take DC input and produce AC output. In the preferred embodiment of the present invention, transverter control signal 20 is coupled into the primary winding 217 of transformer 218. A 100 ohm resistor 220 helps transformer 218 maintain a balanced flux. The primary winding 217 is coupled magnetically to secondary winding 219. Transformer 218 also includes a Hall Effect sensor 222 which measures the flux in the core of the transformer. A goal of the circuit is to have no flux in the core, i.e., the current turns product coming out of secondary winding 219 is the same as the current turns product going into primary winding 217. The Hall Effect sensor produces a signal that is proportional to the flux and through it. This signal is fed into the Field Effect Transistor (FET) switch controller 224. FET switch controller 224, controls FET switch assemblies 226, 228, 230 and 232 which generate current through secondary winding 219 such that the flux in transformer 218 maintains balance. Each of the FET switch assemblies 226, 228, 230 and 232 are generally known power FET switches. Regulated DC voltage 210 comprises a +DC voltage 234 and a −DC voltage 236. The +DC voltage is applied to FET switch assemblies 226 and 230. The −DC voltage is applied to FET switch assemblies 228 and 232. When FET switch assembly 226 and 232 are turned on, a potential will exist across 500 uh inductor 238, secondary winding 219, 4.7 uf capacitors 240 and 242 and 500 uh inductor 244. The potential is such that it is + at the top of inductor 238 and − at the bottom of inductor 244.

The current controlled AC voltage source 212 provides conditioned AC output voltage 16 in the form of a sine wave. The sine wave will have a positive half and a negative half. The sine wave will be formed across capacitors 240 and 242. As FET switch assemblies 226 and 232 go on, a current flows through capacitors 240 and 242 and a voltage is developed across them. The FET switch assemblies are switched at very high frequencies (70 k cycles per second). This causes the positive half of the sine wave to be built in increments as the switch assemblies go on, shut off, go on, etc. The switch is under the control of FET switch controller 224. Similarly, FET switch assembly 228 and 230 are switched on an off to produce the negative half of the sine wave.

A center tap 246 between capacitors 240 and 244 is provided to enable the preferred embodiment of the invention to have the capability of providing either a 120 or 240 volt AC output sine wave, depending on whether center tap 246 is used to access conditioned AC output voltage 16. An implementation of such a configurable circuit is set forth in U.S. Pat. No. 5,260,864 by Simonelli et al, entitled CONFIGURABLE INVERTER FOR 120 VAC OR 240 VAC OUTPUT.

Figure 13:
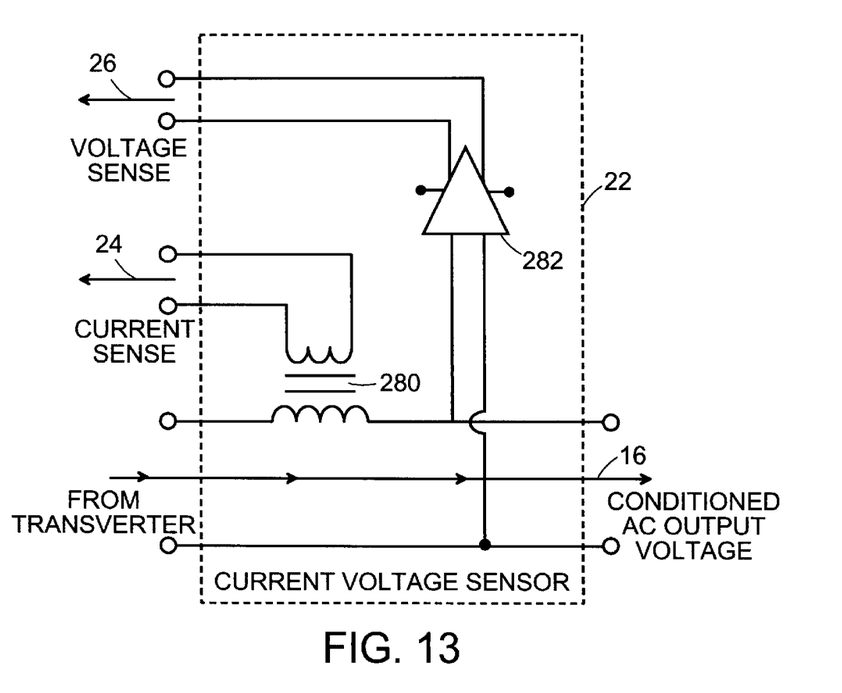
FIG. 13 is a circuit diagram of the current/voltage sensor as used in the preferred embodiment of the invention.

Referring now to FIG. 13, current voltage sensor 22 is shown outside transverter 12 and receives as input conditioned AC output voltage 16 from transverter 12. Current voltage sensor 22 monitors the total voltage and total current being supplied by one (or more) transverters operating in a particular voltage phase. The monitored voltage sense 26 and monitored current sense 24 are fed back to system control module 18 as hereinbefore described. Current voltage sensor 22 includes AC current transformer 280 with a turns ratio to produce a reflection of the current flowing through the transformer. Current voltage sensor 22 also includes amplifier 282 which shows both AC and DC components of the voltage coupled into it. Amplifier 282 reflects conditioned AC output voltage 16 at a lower and isolated voltage.

Figure 14:
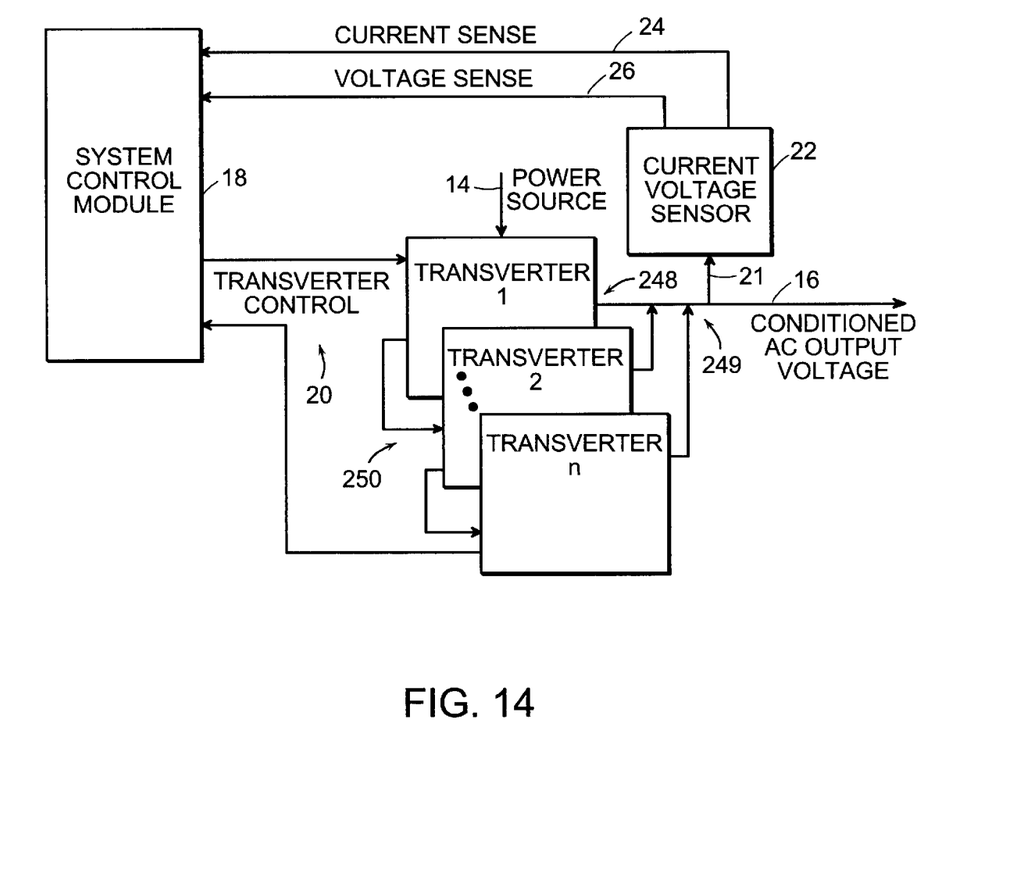
FIG. 14 shows in block diagram form the preferred embodiment of the invention implementing multiple transverters.

Referring now to FIG. 14, an arrangement is shown implementing multiple transverters. Referring briefly back to FIG. 1, the preceding description has focused on a single transverter 12 receiving input from power 14 from a power source and producing conditioned AC output voltage 16, under the control of system control module 18 and current voltage sensor 22. In FIG. 14, a plurality 248 of transverters (transverter 1, transverter 2 . . . transverter n), all operating on the same power source voltage phase, are interconnected such that their outputs 249 are in parallel and each transverter provides an equal portion of the power output (e.g., where in the preferred embodiment three transverters are implemented and each produce one third of the power output). Each of the transverters in plurality 248 operate as described for transverter 12 and as shown in FIGS. 11 and 12. However, transverter control signal 20 is fed to and through plurality 248 over series interconnection 250, described in more detail hereinafter, such that each of the transverters of plurality 248 receive the same transverter control current 20.

Figure 15:
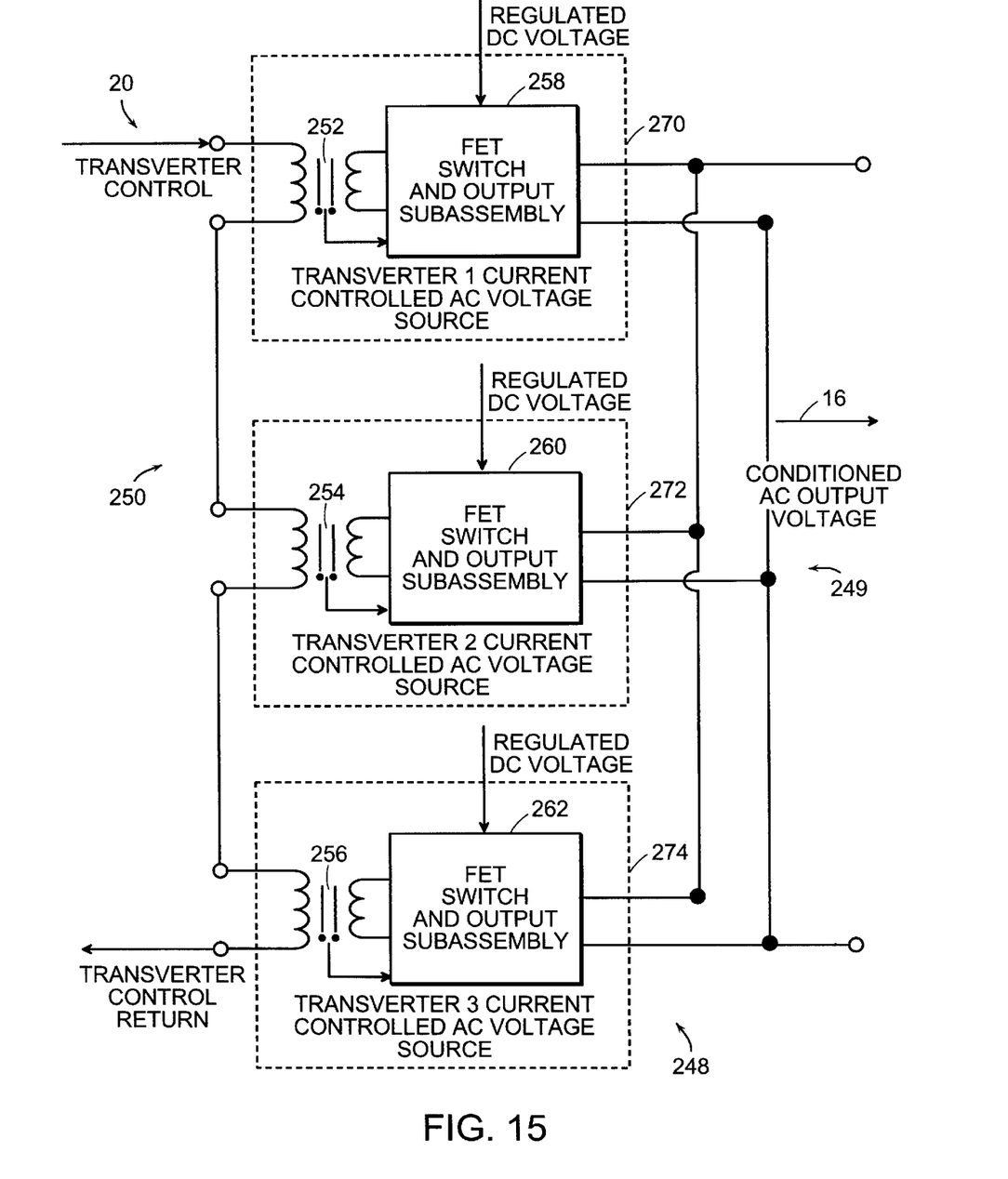
FIG. 15 depicts in both block diagram and circuit diagram form the interconnection of the multiple transverter implementation.

Referring now to FIG. 15, the interconnection of the multiple transverter implementation as shown in FIG. 14 is shown. Transverter plurality 248, in the preferred embodiment, comprises three transverters which each have its own current controlled AC voltage source 270, 272, 274. Transverter 1 current controlled AC voltage source 270 has a transformer 252 and FET switch and output subassembly 258. Transverter 2 current controlled AC voltage source 272 has a transformer 254 and FET switch and output subassembly 260. Transverter 3 current controlled AC voltage source 274 has a transformer 256 and FET switch and output subassembly 262. Each of the transformers 252, 254 and 256 has a Hall Effect sensor coupled to its respective FET switch and output subassembly. Each of the FET switch and output subassemblies 258, 260 and 262 receive regulated DC voltage as hereinbefore described. Transverter control signal 20 feeds the primary winding of transformer 252 of transverter 270. Transformer 254 of transverter 272 is coupled in series to transformer 252 over series interconnection 250. Transformer 256 of transverter 274 is coupled in series to transformer 254 similarly over series interconnection 250. Each of the FET switch and output subassemblies 258, 260, 262 have their respective outputs connected into parallel interconnection 249 and produce in combination conditioned AC output voltage 16.

Figure 16:
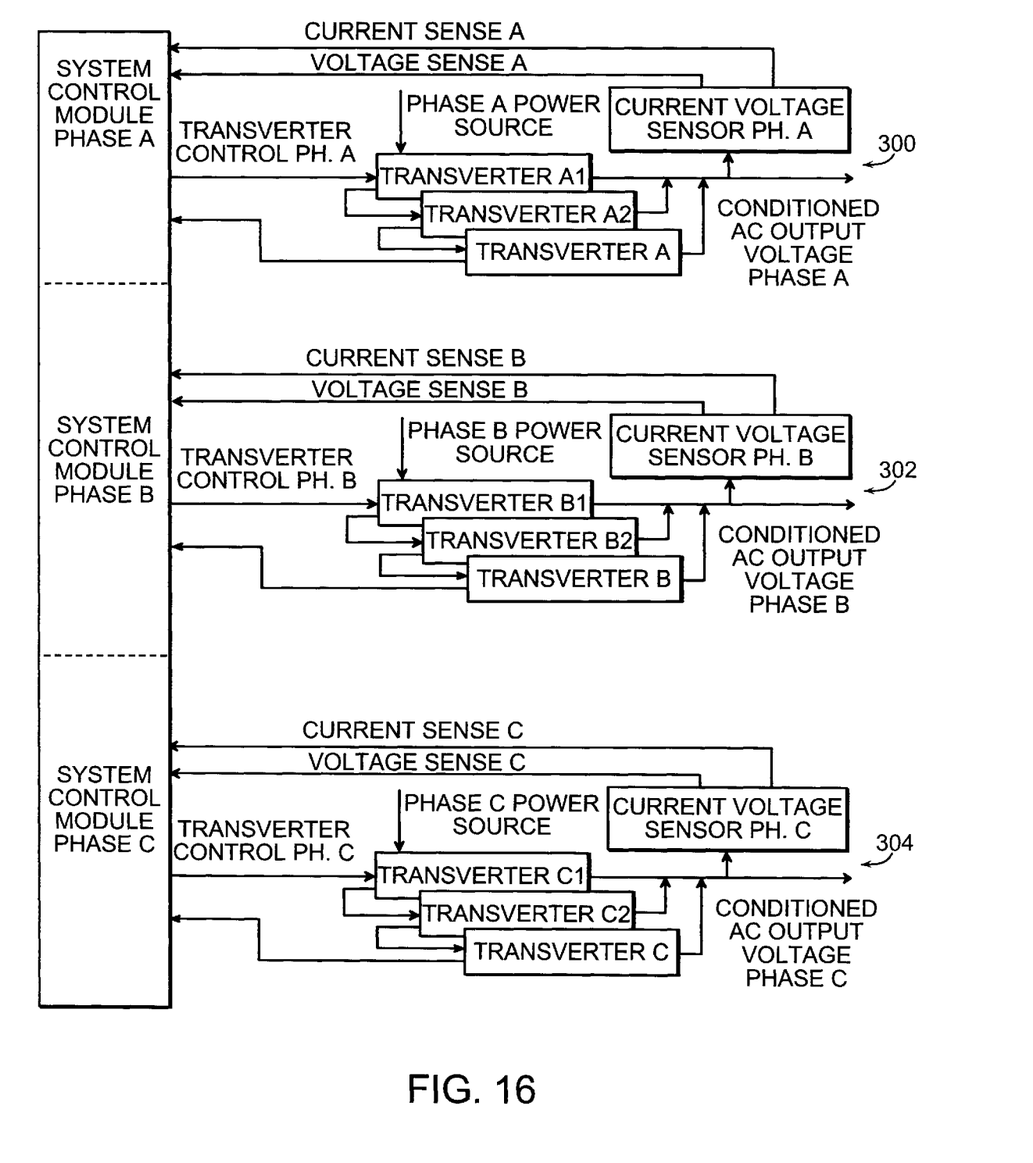
FIG. 16 shows the preferred embodiment of the invention implementing a three phase power system.

Referring now to FIG. 16, an arrangement implementing a three phase power system is shown. Hereinbefore the discussion has focused on a single phase AC power system. Needless to say, power systems can operate with multiple phases, such as a typical three phase AC power system (e.g., a Phase A at 0 degrees, a Phase B at 120 degrees and a Phase C at 240 degrees). In accordance with the preferred embodiment of the present invention, each phase of a three phase AC power system, and as shown in FIG. 16, has a separate transverter controlled feed back subsystem 300, 302, 304 for each of the respective Phase A, Phase B, and Phase C power sources. Each of the subsystems 300, 302, 304 operate independent of each other but could be integrated on common module boards, have common three phase output connectors, etc.

While a preferred embodiment has been described herein, variations will become apparent to those skilled in the art without departing from the principles and spirit of the invention, the scope of which is defined in the appended claims. For example, the system could be expanded to provide higher power levels by increasing the number of transverters per phase.

In addition, while the method and apparatus has been described in a preferred embodiment for use in providing a continuous supply of conditioned AC power for computer systems, other embodiments of the invention have usefulness. For example, the transverters could be built to provide DC power. In such a system the transverter could be placed directly into computer or telecommunication equipment. If battery support was also included, such a system would help reduce total cost, improve efficiency and eliminate the need of a separate power supply to maintain power when the power utility fails to provide the initial power source.

What is claimed is:

1. An apparatus for controlling application of a conditioned AC value comprising:

a) transverter means for receiving an unconditioned AC voltage and for converting said unconditioned AC voltage into a transverter AC output voltage, wherein said transverter means includes a plurality of transverters, with outputs of each of said transverters connected in parallel to produce said transverter AC output voltage and inputs of said transverters connected in series to receive a transverter control signal, b) current voltage sensor means coupled to said transverter means for monitoring said transverter AC output voltage;

c) means for converting said transverter AC output voltage into said conditioned AC output voltage in response to both current sensing and voltage sensing by said current voltage sensor means.

2. An apparatus according to claim 1 wherein said means for converting includes:

means for developing a transverter control signal in response to changes in said current sensing and said voltage sensing in comparison with a reference signal, with said transverter control signal regulating conversion of said transverter AC output voltage into said conditioned AC output voltage.

3. An apparatus according to claim 2 wherein said transverter means includes:

a) a voltage regulator which produces a regulated DC voltage in response to said unconditioned AC voltage; and b) current controlled AC voltage source means for producing said conditioned AC output voltage in response to said regulated DC voltage and said transverter control signal from said means to convert.

4. An apparatus according to claim 1 wherein said means to convert includes:

means for developing a transverter control signal in response to changes in said current sensing and said voltage sensing in comparison with a reference signal, said transverter control signal regulating conversion of said transverter AC output voltage into said conditioned AC output voltage.

5. An apparatus according to claim 4 wherein said transverters each include:

a) a voltage regulator which produces a regulated DC voltage in response to said unconditioned AC voltage; and b) current controlled AC voltage source means for producing a portion of said conditioned AC output voltage in response to said regulated DC voltage and said transverter control signal from said means to convert.

6. An apparatus for controlling a multi-phase conditioned AC voltage signal, comprising:

a) transverter means for each phase, each transverter means having means to receive an unconditioned AC voltage for a particular phase and convert said unconditioned AC voltage into a transverter AC output voltage for said particular phase, wherein:

said transverter means for each phase includes a plurality of transverters for a particular phase, the outputs of each of said transverters for said particular phase connected in parallel to produce said transverter AC output voltage for said particular phase, the inputs of said transverters for said particular phase connected in series to receive a transverter control signal for said particular phase; and said means for each said particular phase to convert includes means to develop said transverter control signal for said particular phase in response to changes in said current sensing and said voltage sensing in comparison with a reference signal for said particular phase;

b) current voltage sensor means for each said particular phase, each current voltage sensor means for said particular phase coupled to said transverter means for said particular phase for monitoring said transverter AC output voltage for said particular phase;

c) means for each said particular phase to convert said transverter AC output voltage for said particular phase into said conditioned AC output voltage for said particular phase in response to both current sensing and voltage sensing by said current voltage sensor means for said particular phase.

7. An apparatus according to claim 6 wherein said means for each said particular phase to convert includes:

means for providing a transverter control signal for said particular phase in response to changes in said current sensing and said voltage sensing for said particular phase in comparison with a reference signal for said particular phase, with said transverter control signal for said particular phase regulating conversion of said transverter AC output voltage for said particular phase into said conditioned AC output voltage for said particular phase.

8. An apparatus according to claim 7 wherein said transverter means for each said particular phase includes:

a) a voltage regulator for said particular phase which produces a regulated DC voltage for said particular phase in response to said unconditioned AC voltage for said particular phase; and b) current controlled AC voltage source means for producing said conditioned AC output voltage for said particular phase in response to said regulated DC voltage and said transverter control signal for said particular phase from said means to convert for said particular phase.

9. An apparatus according to claim 6 wherein said means for each said particular phase to convert includes:

means for providing a transverter control signal for said particular phase in response to changes in said current sensing and said voltage sensing for said particular phase in comparison with a reference signal for said particular phase, said transverter control signal for said particular phase regulating conversion of said transverter AC output voltage for said particular phase into said conditioned AC output voltage for said particular phase.

10. An apparatus according to claim 9 wherein said transverters for said particular phase each include:

a) a voltage regulator for said particular phase which produces a regulated DC voltage for said particular phase in response to said unconditioned AC voltage for said particular phase; and b) current controlled AC voltage source means for said particular phase for producing a portion of said conditioned AC output voltage for said particular phase in response to said regulated DC voltage for said particular phase and said transverter control signal for said particular phase.

11. A method comprising the steps of:

a) receiving an unconditioned AC voltage by a transverter means, said transverter means having means for converting said unconditioned AC voltage into a transverter AC output voltage, wherein said transverter means includes a plurality of transverters, the outputs of each of said transverters connected in parallel to produce said transverter AC output voltage, the inputs of said transverters connected in series to receive a transverter control signal;

b) monitoring said transverter AC output voltage by current voltage sensor means; and c) converting said transverter AC output voltage into said conditioned AC output voltage in response to both current sensing and voltage sensing by said current voltage sensor means.

12. The method according to claim 11 wherein the step of converting includes the steps of:

developing a transverter control signal in response to changes in said current sensing and said voltage sensing in comparison with a reference signal; and using said transverter control signal to regulate conversion of said transverter AC output voltage into said conditioned AC output voltage.

13. The method according to claim 12 wherein the step of receiving an unconditioned AC voltage by said transverter means includes the steps of:

a) producing a regulated DC voltage in response to said unconditioned AC voltage; and b) producing said conditioned AC output voltage in response to said regulated DC voltage and said transverter control signal.

14. The method according to claim 11 wherein the step of converting includes the steps of:

developing a transverter control signal in response to changes in said current sensing and said voltage sensing in comparison with a reference signal; and using said transverter control signal to regulate conversion of said transverter AC output voltage into said conditioned AC output voltage.

15. The method according to claim 14 wherein the step of receiving an unconditioned AC voltage by said transverter means includes the steps of:

a) producing a regulated DC voltage in response to said unconditioned AC voltage; and b) producing a portion of said conditioned AC output voltage in response to said regulated DC voltage and said transverter control signal.

16. A method for controlling generation of multi-phase conditioned AC voltage comprising the steps of:

a) receiving for each phase an unconditioned AC voltage by transverter means for a particular phase, said transverter means for said particular phase having means for said particular phase to convert said unconditioned AC voltage for said particular phase into a transverter AC output voltage for said particular phase, wherein the step of receiving unconditioned AC voltage for said particular phase by transverter means for said particular phase includes the step of:

receiving unconditioned AC voltage for said particular phase by a plurality of transverters for said particular phase, the outputs of each of said transverters for said particular phase connected in parallel to produce said transverter AC output voltage for said particular phase, the inputs of said transverters for said particular phase connected in series to receive a transverter control signal for said particular phase;

b) monitoring said transverter AC output voltage for said particular phase by current voltage sensor means for said particular phase; and c) converting said transverter AC output voltage for said particular phase into said conditioned AC output voltage for said particular phase in response to both current sensing and voltage sensing for said particular phase by said current voltage sensor means for said particular phase.

17. The method according to claim 16 wherein the step of converting includes the steps of:

developing a transverter control signal for said particular phase in response to changes in said current sensing and said voltage sensing for said particular phase in comparison with a reference signal for said particular phase; and using said transverter control signal for said particular phase to regulate conversion of said transverter AC output voltage for said particular phase into said conditioned AC output voltage for said particular phase.

18. The method according to claim 17 wherein the step of receiving an unconditioned AC voltage for said particular phase by said transverter means for said particular phase includes the steps of:

a) producing a regulated DC voltage for said particular phase in response to said unconditioned AC voltage for said particular phase; and b) producing a portion of said conditioned AC output voltage for said particular phase in response to said regulated DC voltage for said particular phase and said transverter control signal for said particular phase.

19. The method according to claim 16 wherein the step of converting includes the steps of:

developing a transverter control signal for said particular phase in response to changes in said current sensing and said voltage sensing for said particular phase in comparison with a reference signal for said particular phase; and using said transverter control signal for said particular phase to regulate conversion of said transverter AC output voltage for said particular phase into said conditioned AC output voltage for said particular phase.

* * * * *